May 21, 1968   M. LEHMACHER ETAL   3,384,528
APPARATUS FOR SEVERING AND WELDING OF
THERMOPLASTIC TUBING FILM
Filed Jan. 11, 1965   3 Sheets-Sheet 1

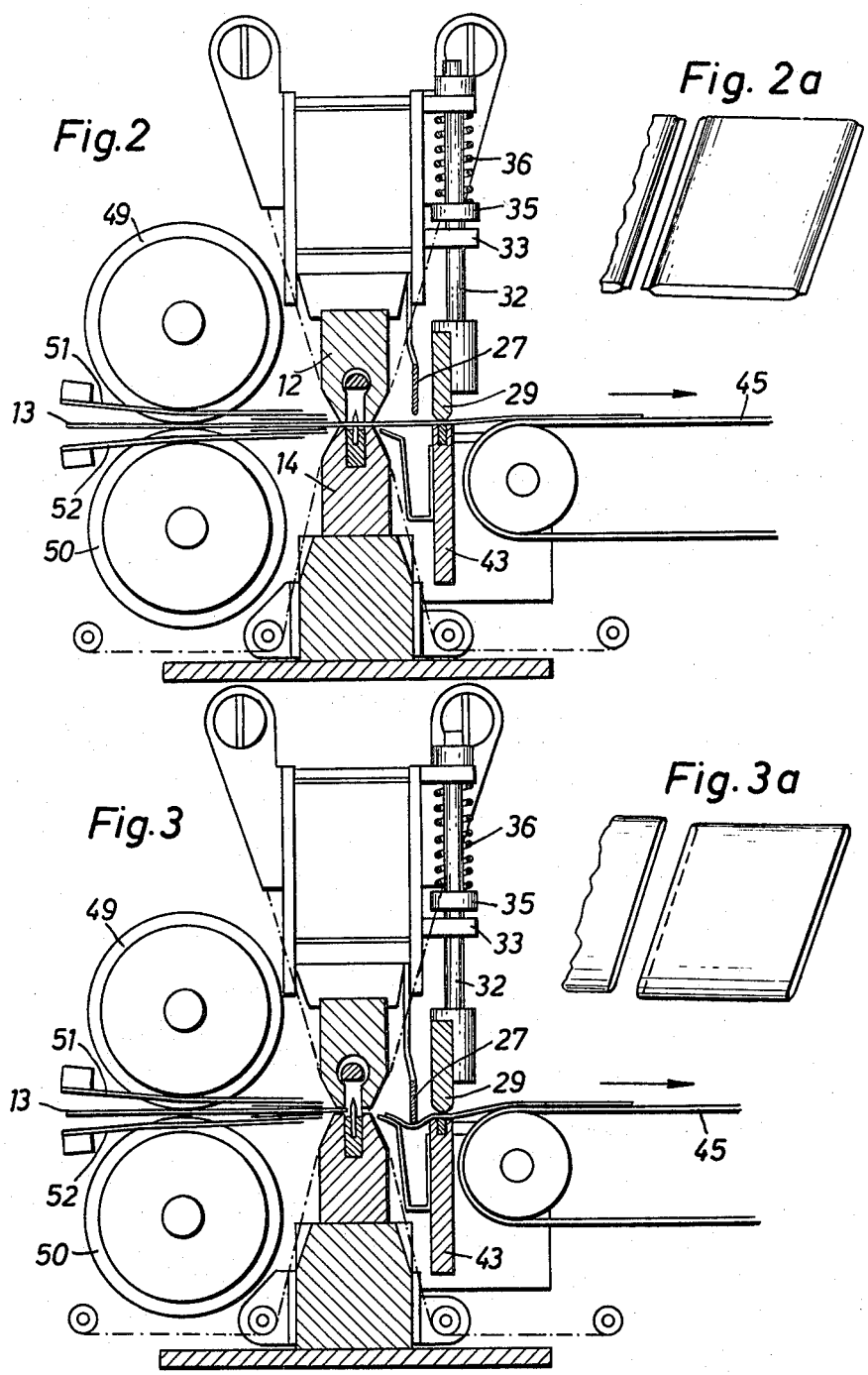

United States Patent Office 3,384,528
Patented May 21, 1968

3,384,528
APPARATUS FOR SEVERING AND WELDING OF THERMOPLASTIC TUBING FILM
Michael Lehmacher, Unterdorfstr., and Hans Lehmacher, Beckergasse, both of Mondorf uber Troisdorf, Germany
Filed Jan. 11, 1965, Ser. No. 424,865
Claims priority, application Germany, Jan. 14, 1964, L 46,772; June 3, 1964, L 47,962
7 Claims. (Cl. 156—515)

ABSTRACT OF THE DISCLOSURE

A weld seaming and severing machine fabricating bag-like articles from thermoplastic film including horizontally spaced feed and withdrawal rolls, a film severing blade and jaw assembly therebetween, lower fixed jaws beneath the film path on opposite sides of the blade; and upper vertically movable jaws cooperatively opposed to respective lower jaws to engage the film on opposite sides of the blade; Teflon foil feeding over and preventing film adhesion to jaw surfaces. In a first form, on the discharge side of the jaws as welding jaws, a film gripper and a film depressor are operable with and adjustable relative to the movable jaws, selectively for side seam welding severance with heated jaws and inoperative depressor, or unseamed tensioned severance with depressor operative and jaws inoperative. A second form has separately adjustable movable upper and unheated unitary lower jaws and a heated cutter blade between and movable with the former reversibly mounted to present a double or single beveled edge, permitting double or single seamed or simple severance, according to the selected jaw gripping, and the blade edge and heat condition used.

---

The present invention relates generally to a machine or apparatus for severing and welding of synthetic plastic, thermoplastic flattened tube-films, or folded films for manufacture of bags, sacks or the like packaging. More particularly, it relates to such apparatus wherein there are provided paired, opposed foil advancing feed and withdrawal rolls between which is located the severing-welding mechanism comprising a knife and jaws disposed on both sides of the knife in pairs displaceable relative to each other in the clamping direction, with which bags can be manufactured selectively with a bottom seam welding or with a side seam welding, and wherein the feed and the withdrawal rolls stop or continue running according to the type of welding.

The principal object of the present invention is the improvement of this type of machine to enable fabrication with greater certainty than heretofore particularly of comparatively thicker films which are used for the manufacture of bags. To obtain this object, in an apparatus for the severing and welding of thermoplastic tube films, or longitudinally folded films, wherein between opposed pairs of feed and discharge rolls there is located a severing-welding mechanism comprised of clamping jaw means disposed pair-wise on both sides of knife means and displaceable relative to each other in the clamping direction, one of said means adapted to be heated for weld seaming, which apparatus is adapted for bag fabrication selectively with a bottom seam welding or with side seam welding, there is proposed in accordance with the invention an improved combination by inclusion of the following. The knife is disposed, for example, in a stationary lower clamping jaw to project beyond the clamping or welding surfaces; and, in the direction of film travel, behind and secured to an upper jaw supporting beam moving up and down relative to the lower jaw, there is arranged a film hold-down or depressor device extending over the length of the jaw and projecting toward the film beyond the clamping or welding surfaces. Behind this hold-down and likewise secured on the support beam for this moving clamp jaw there is a spring loaded film gripper or retainer bar, likewise extending the length of the clamp jaws, which in retracted or rest position projects toward the film beyond the movable jaw and selectively the hold-down for cooperation with an opposed or counter support element in the form of a bar on the other side of the film. Behind the latter device there are arranged withdrawal or discharge roll means of a form per se known.

In accordance with a further feature of the invention, as embodied in the above example, the hold-down is secured, adjustable in height, on the support beam for the moving clamp jaw. By another feature, behind and extending over the length of the lower stationary welding jaw, there is provided a bottom-rounded film stock support device and between the support device and the counter support element for the spring loaded film retaining gripper, there is provided a sufficient slot for the film depressor; with the upper surface of the support device and of the counter-support element at a level below that of the knife edge.

In accordance with a further characteristic of the invention, on its side disposed toward and adjacent the clamp jaw, the support surface is provided with a cooling water conduit.

A further proposal of the invention is to use a cutting knife with a saw-toothed edge, which is reciprocated longitudinally thereby to sever the tube with a saw cut.

In the combination with the cutting knife, which can be arranged stationary, as well as supported for longitudinal oscillation and having a saw-toothed edge, films of comparatively great thickness can be cut and also welded with the welding device of the above described kind, wherein by only a minor adjustment of the hold-down with the apparatus otherwise unchanged, advantageously bags may be fabricated selectively with a bottom-seam welding or a side-seam welding.

This and further examples of embodiments of the invention are hereinafter set forth.

Other objects and advantages will appear from the following description and the drawings, wherein:

FIG. 2 is a view similar to FIG. 1, showing the hold-down or depressor out of operation for fabrication of bags having a side seam weld;

FIG. 2a is a perspective view of a bag with side seam welding made with apparatus in the adjustment or the disposition shown in FIG. 2;

FIG. 3 is a view similar to FIG. 1 with the hold-down in operative disposition, for making bags or sacks with a bottom seam welding;

FIG. 3a is a perspective view of a bag with a bottom seam weld fabricated by the apparatus in the adjusted condition represented in FIG. 3;

Figure 1:
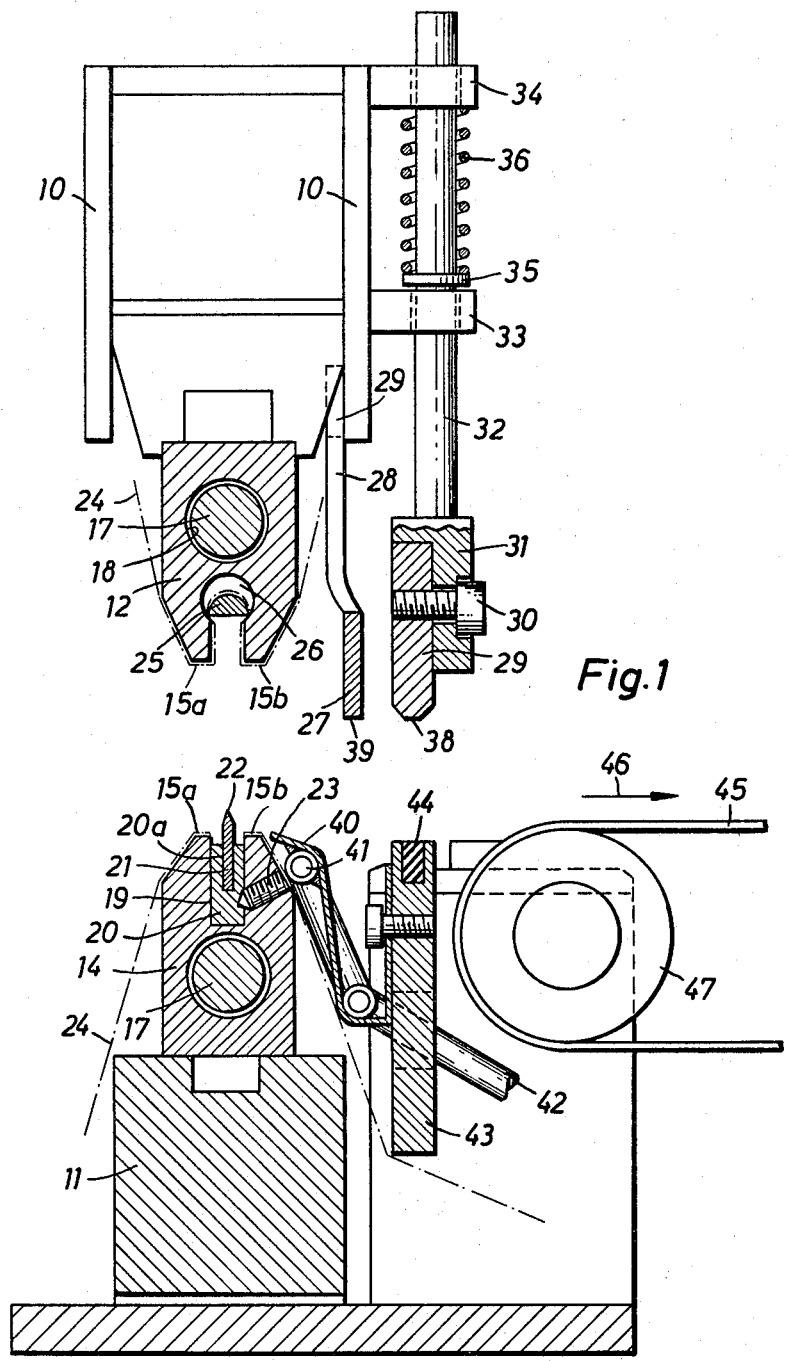
FIG. 1 is a side view partly in section of an apparatus for severing and welding of long or continuous thermoplastic tube-films or the like in the fabrication of bags or sacks.

A severing-welding machine or apparatus embodying the invention, for fabrication of bags, sacks or the like objects from thermoplastic synthetic plastic films, is shown in the drawings. With such apparatus, the film layers to be welded to one another can be presented in the form of merely a continuous or long flat collapsed tube, also in the form of a tube of which a longitudinal edge is cut, or in the form of two film webs superimposed on one another with web edge over web edge.

The machine is comprised of the frame elements or supports 10 and 11 secured on a machine base or frame, not represented. On the vertically reciprocating member 10 there is secured the clamping and welding jaw 12, extending transversely to the path of movement of the film web or sheet 13 (see FIG. 2) to be worked; and on the support 11, there is secured in parallel to jaw 12 the other cooperating fixed clamping and welding jaw 14. Both jaws 12 and 14 have welding faces $15^a$ and $15^b$ spaced from one another in the direction of the film web travel and are provided with a heating device in the form of glow bars 17 supported in the longitudinal bores 18, running entirely through the respective jaws.

In a longitudinal slot 19 there is inserted, and held by pointed set screw means 23, a blade carrier bar 20 likewise itself having an upwardly open slot 20a for insertion of a knife blade 21, of which the edge can be smooth, or of saw-toothed shape. As represented in dotted lines, so that the seamed stock will readily separate from the jaws, a shiftable band or web 24 of the synthetic plastic designated as "Teflon" is led over the welding surfaces $15^a$ and $15^b$ of the clamping jaw 12, and is supported and guided by a bar 25, half round in cross section, in the trough shaped groove 26 with clearance from and out of reach of knife 22. Likewise across the welding faces $15^a$ and $15^b$ and as well around the bar 20 there is led a similar band 24.

On the support 10, as seen in the direction of the moving film web 13, behind the jaw 12, there is disposed a film depressor device or hold-down 27 in the form of a bar extending parallel to and over the entire length of the jaw 12. A plurality of spaced mounting arms 28 on the hold-down 27 at their ends are provided each with a longitudinal slot 29 for vertically adjustable bolting to the support member 10. It is to be noted that this film depressor or hold-down 27 can also be secured on the jaw 12 itself, so long as a necessary spacing relative to the latter is preserved. Behind the hold-down 27 there is located a film retainer or gripper including a bar 29 extending the length of and parallel to the hold-down 27 and also the clamp jaw 12.

The bar 29 is shiftably mounted on support 10, by a plurality of spaced devices, each comprised of a shank 32 extending through the aligned bores in the two apertured lugs 33 and 34 on the carrier member 10 and having a lower enlarged end 31 to which bar 29 is secured by a respective screw 30. Above the lug 33 the shank is provided with a collar 35 and a pressure spring 36 interposed between the under-surface of the lug 34 and collar 35, whereby the film gripper bar is constantly urged downwardly as indicated by the applied direction arrow 37 toward the cooperating parallel fixed counter support element 43, with the lower position determined by the collar 35 as a stop against lug 33.

In the rest or retracted position represented in FIG. 1, the front or working face 38 of the foil hold-back or retainer 29 is located opposite the front or working face 39 of the hold-down 27, that is, both faces 38, 39 lie in the same horizontal plane.

Behind the lower clamp jaw 14 there is mounted a downwardly and rearwardly bent film support 40, on the side of which disposed toward the clamp jaw 14 there is a tube 41 for conduction of cooling water supplied through pipe 42. For simplicity of representation, the water discharge tube is not illustrated by drawings. At a sufficient distance behind the support 40 and aligned exactly opposed to the foil gripper stop bar 29, there is an opposed support 43 of which the front or working side is provided with an inset rubber strip 44. From FIG. 1 it is to be observed that there is a sufficient distance between the support 40 and the counter support 43 to permit introduction of the hold-down 27 therebetween. In FIG. 1 further is illustrated a discharge belt 45 running in the direction of the applied arrow 46 and guided by the roll 47, for the withdrawal or discharge of the finished bag.

With reference to FIGS. 2 and 3, there is described a method of operating the apparatus for fabrication of bags or sacks with bottom seam welding or a side seam welding as desired. In the setting shown in FIG. 2, the depressor or the hold-down 27 is so adjusted in height that it does not project beyond the welding faces $15^a$ and $15^b$ of the clamping jaw 12 and is thereby not operable in the manner hereafter explained. With the setting of FIG. 2 a bag is made with a side seam, that is, as seen in FIG. 2a, there results a severing cut with a welded seam on each side thereof.

This type of severing-welding finds application not only for fabrication of sacks or bags, but also of other objects produced from thermo-plastic films.

In FIGS. 2 and 2a, the tube-film 13, which there is shown as cut off or slit along the forwardly disposed longitudinal edge, is advanced forwardly by the feed rolls 49 and 50 past the separated jaws 12 and 14. Further there are represented the guiding blades 51 and 52, which rhythmically introduce and also later lift the foil from the lower welding jaw. As each feed advance corresponding to a bag length or bag width has been completed, then the jaws 12 and 14 are moved in a direction towards one another bringing the welding faces $15^a$ and $15^b$ into contact under an adjustable pressure with the film therebetween by operation of known means therefor, not represented. Before the opposed contact of the jaws 12 and 14 is attained, the foil gripper 29, projecting beyond the welding faces $15^a$ and $15^b$ of the clamp 12, as shown in FIG. 1, clamps the film 13 against the counter support 43. During the approach of the jaws 12 and 14, the film 13 is cut through by the knife 22 and the welding together on both sides of the cut is achieved. For this operation, the cutting knife can be arranged in stationary fashion and have a smooth edge, but also it can oscillate longitudinally at a high frequency and have a serrated cutting edge. The choice of the knife is also determined in accordance with the thickness of the film to be worked or cut. With the setting of FIG. 3, the hold-down is so adjusted that its forward end projects beyond the welding faces $15^a$ and $15^b$ of jaw 12, and through this simple adjustment from the setting in FIG. 2, bags or sacks with a bottom seam can be prepared, that is, there is obtained a severing cut and only one welding adjacent thereto, as shown in FIG. 3a.

In FIG. 3 the feeding of the film tube by the advance rolls 49 and 50, past the separated jaws 12 and 14 and the gripper bar 29 lifted away from its counter support element 43, proceeds in the manner of previously described FIG. 2. As soon as the film tube is introduced, jaw 12 is moved toward the jaw 14 and also the gripper bar 29 is brought against support element 43 with the film held therebetween. The bar 29 under the influence of the pressure spring 36 projects well beyond the welding faces $15^a$ and $15^b$ on the jaw 12, so that it clamps the film securely on the counter support element before the welding jaws 12 and 14 come into contact on the film.

But also the film depressor or hold-down 27 projects beyond the welding faces $15^a$ and $15^b$ of jaw 12, and since the latter is positioned somewhat behind the bar 29, the film 13 is stretched and pressed downwardly by the depressor or hold-down 27 upon the descent of support 10 or the clamp jaw 12. With this stretching and depression, the film 13 is severed by the cutting knife 22 and before the welding faces $15^b$ of the jaws 12 and 14 touch one another, the severed lead portion is drawn away from between the jaws, sliding over the support 40. The jaws 12 and 14 weld the film-tube accordingly only with the welding surfaces $15^a$, because on the opposed welding faces 15ᵃ and 15ᵇ on the jaw 12, so that it clamps the film rather was previously drawn away. With the relative withdrawal of the jaws 12 and 14, the hold-down and gripper bar are also lifted away, releasing the finished bag for discharge on 45, so that the next work cycle beginning with the introduction of the next tube section can ensue.

With particularly thick foils, it is advantageous not to use the hold-down 27, but rather to move the film gripping retainer device 29 and 43 downwardly after their opposed film gripping contact is achieved, so that thereby likewise after cutting by knife 22, the foil is withdrawn from the region of the welding faces 15ᵇ so that these cannot become effective.

If a foil is to be merely cut without a welding, then the heating of the welding jaws 12 and 14 is turned off. With thin films, cutting can be done by the cutting knife with the working method of FIG. 2, while with thick foils, the working method of FIG. 3 is used.

From the illustrations in FIGS. 2 and 3, it is obvious that in the change-over of an apparatus for fabrication of bags or sacks with a bottom-seam to one with a side-seam welding, merely the hold-down 27 needs to be adjusted. This adjustment is possible with a little manipulation, and can also be obtained through an eccentric lever, so that then it is unnecessary even to loosen and again tighten up screws.

To avoid heating of, and consequent baking of the film onto, the support 40, the latter is water cooled.

Figure 4:
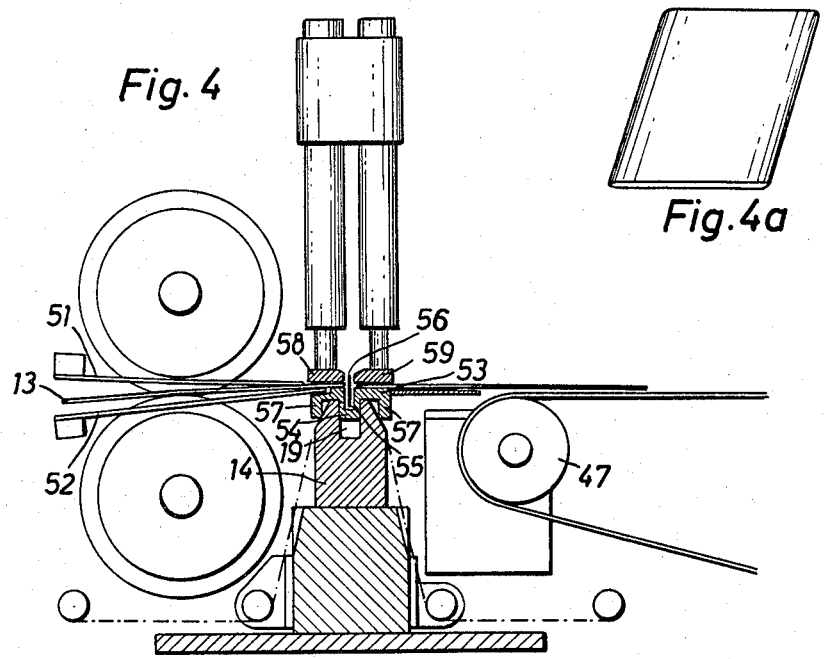
FIG. 4 is a side view similar to that of FIG. 1, but on a smaller scale, showing a modification especially adapted for fabrication of thin walled bags.
Figure 4A:
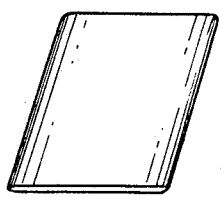
FIG. 4a is a perspective view of a bag with side seam welding made by the apparatus represented in FIG. 4.

In FIG. 4, the cutting knife 21 with associated bar 20 of FIG. 1 is withdrawn from the clamping and welding jaw 14, and there is inserted in the jaw slot 19 a support platen 53 having a tongue 54 projecting into the slot or groove 19; the tongue in turn on its side disposed toward the film 13 having an upwardly open groove 55 into which can extend a heated glow strip 56, the function of which strip will be described in detail in conjunction with FIGS. 5 to 10.

The support or platen 53 extends over the length of the welding jaw 14 and on its longitudinal edges for additional support is provided with spacing support ribs 57 directed towards and resting on the inclined upper surfaces of the welding jaw 14. The welding jaw 12 represented in FIG. 1 is here replaced by two unheated clamp jaws 58 and 59 disposed relatively displaceably to one another as will be hereinafter described in detail in conjunction with FIGS. 5 and 7.

Particularly thin films are worked with the construction of FIG. 4, wherein the welding is attained through the heated glow strip 56, but this arrangement also can produce a severing cut without welding, as will be hereinafter described.

Figure 5:
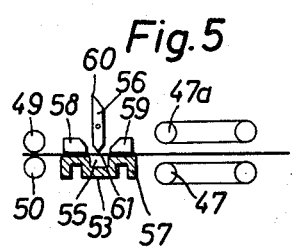
FIGS. 5, 6, 7 show different working dispositions of the severing and welding device.

The generally schematic FIG. 5 shows the clamping jaws 58 and 59 cooperatively contacting the support platen 53 with the film therebetween, and furthermore the heated glow strip 56 as presenting different types of cutting edges 60 and 61 on opposite longitudinal sides. The glow strip 56 is rotatable 180° about its longitudinal axis, so that selectively the edges 60 or 61 can come into use; and it is mounted for vertical movement toward and away from the platen 53 with or independently of the clamping motion of jaws 58 and 59.

Figure 8:
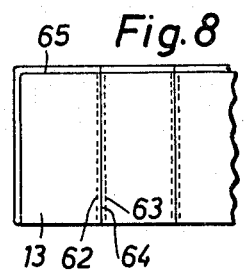
FIGS. 8, 9 and 10 show the different bag forms obtained corresponding to the different working settings represented in FIGS. 5, 6 and 7, respectively, thereabove.

For fabrication of a bag with side seam welding wherein, as appears from FIG. 8, there is a severing cut 64 between two welding lines 62 and 63, the rolls 49 and 50 advance a folded film, or a film tube cut on the edge 65, between the platen 53 and the raised clamp jaws 58 and 59 and the heated strip 56 lifted therewith.

After the two film layers are introduced into the severing and welding mechanism, then the clamp jaws 58, 59, and the heated strip 56 descend with the double sloped knife edge 61 functioning. As the cut is made the sloped faces defining the edge ensure welding contact with transverse film edges produced by the cutting. Thus there is obtained the side seam welding represented in FIG. 8 with a separating cut 64 lying between the weld seams 62 and 63. Thereafter the belts and rolls 47 and 47ᵃ come into operative position to remove the finished bag, and then retract.

Figure 6:
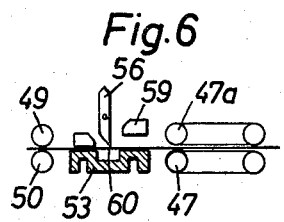
Figure 7:
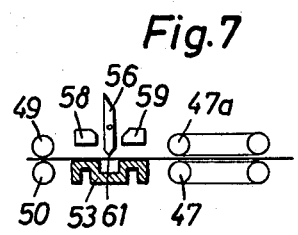
Figure 9:
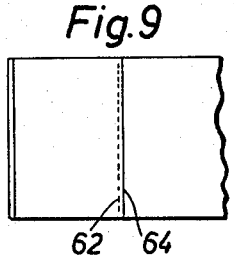

However, with the heated strip turned through 180°, as appears in FIG. 6, bringing the single sloped edge 60 into use, then a bag can be fabricated with a bottom seam welding, as illustrated in FIG. 9, because only the separating cut 64 and one weld seam 62 are produced. The clamping jaw 59 is in this case lifted away and the discharge rolls 47 and 47ᵃ are functional. These discharge rolls draw the advance section of the doubled foil 13 away from the glow band 56 and thereby in conjunction with the single side sloped edge 60, there is obtained only the separating cut 64 with the adjacent weld seam 62 on the end of the remaining part of the film web.

Figure 10:
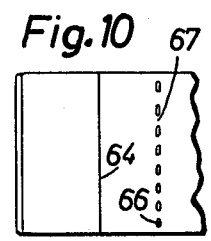

If the doubled foil, or even only a simple foil, is merely to be cut and hence only a separating cut 64 is to be obtained, then the two clamp jaws 58 and 59 are in elevated position or out of action, and the edge 61 of the heated band is functional, and so also the two discharge rolls 47 and 47ᵃ. The film then is held fast by the feed rolls 49 and 50, and a pull is applied to the film through the discharge rolls 47, 47ᵃ. The double sided edge 61 of the glow strip 56 then severs the film or the two film layers without welding them together. When the edge 61 is formed with serrations or spaced cutting projections, the perforations 66 illustrated in FIG. 10, are produced, that is, the cut is interrupted by the bridges 67.

The knife 56 can be supported in a mounting means permitting vertical shifting of its lowermost edge from a level above the film stock path downwardly into the groove 55, as one or both of the upper jaws 58, 59 are brought down into film clamping relation; as for example, if upwardly biased in mounting means on the lower jaw or its support and encountered by a downwardly descending element, or if mounted on a movable support or carriage for the upper jaws.

Hence, bag-like articles or products adapted for use as such are producible by various thermoplastic film stocks, or to be distributed in rolls of substantial lengths that may be perforated for ready tearing off of smaller sheets. Thus a continuous length of film extruded in tube-like form and flattened as it is wound into rolls of stock, or as it is fed directly to a machine embodying the present invention, is converted into bags by the bottom seam welding type operation. Flat stock folded longitudinally, for example, as it is fed, or flattened tubing slit along one longitudinal edge, is made into bags by the side seam welding operation which also may be used to produce pieces with opposite ends both open from super-imposed distinct webs. Further composite product forms may be made from stock fed in more than two layers. Also tubing may be merely cut without seaming to provide doubly open-ended objects; or two or more superimposed distinct webs may be seamed and severed with the set up of FIG. 3 to produce a plurality of sheets held in book-like form, to give merely some further examples of the flexibility of operation available.

We claim:

1. For fabricating bags, sacks or like objects by weld seaming and severing from thermoplastic film stock in the form of a flattened tube, a longitudinally folded web, or two superimposed webs, a machine of the type including cooperating stock feed rolls, product withdrawal rolls spaced therefrom to define a stock path, and severing and seam welding mechanism disposed across the path therebetween, said machine adapted especially for making bags selectively of either a side or bottom seamed type and comprising:

a said mechanism including elongated, vertically movable upper jaw means and fixed lower jaw means on opposite sides of, and each providing a pair of horizontally spaced stock clamping faces extending transversely to, the said path to form horizontally spaced pairs of vertically opposed stock clamping faces, at least one of said means being heatable for seam-welding stock contact, fixed lower and vertically reciprocable upper support means for the respective jaw means, a stock severing blade extending transversely across said path and disposed in the lower jaw means between said opposed pairs and projecting above the clamping faces of the lower jaw means, said upper jaw means providing a downwardly open longitudinal slot affording clearance for said blade when the jaw means are brought into clamping relation on stock therebetween;

and means for selectively tensionally engaging said stock comprising a stock depressor device and a foil stock retaining gripper device located between said jaw means and said withdrawal rolls, said gripper device comprising
- a lower gripper bar on the said lower support means and having a top working face below said path, and
- an opposed movable upper gripper bar above said path vertically yieldably mounted on and resiliently biased downwardly relative to said upper support and having a longitudinal lower gripping face normally disposed below the gripping faces of the upper jaw means, said depressor device including a depressor bar with a stock contacting bottom face and located between said upper bar and upper jaw means and secured to move vertically with said upper support, said bars extending parallel to and over the length of said jaw means, said depressor bar vertically adjustable relative to said upper support selectively between one non-functional location with said bottom face no lower than the gripping faces of the upper jaw means and a second location no lower than the gripping face of the upper bar in its position biased lowermost relative to said upper support;

whereby with said depressor bar at the second location, upon descent of the upper support and jaw means said upper gripper bar grips the stock against the opposed lower bar, then said upper jaw means carries said stock against said knife blade, and thereafter said depressor stretches said stock downward applying tension thereto between said gripper device and blade, thereby to sever and withdraw said stock from the discharge side of said jaw means before said jaw means come into stock clamping and, when heated, into stock seam welding relation on the feed side of the blade for bottom seam welding of stock, and whereby with said depressor bar in said first location, it is inoperative for application of tension to said stock thereby permitting stock to remain between both said vertically opposed pairs of clamping faces for production of side seaming welds by said jaw means on opposite sides of a severing cut through said stock.

2. A machine as described in claim 1 including a stock supporting device having a top surface extending the length of and parallel to said lower jaw means adjacent to and sloping downwardly from its discharge side clamping face; the upper surfaces of said supporting device and said lower bar being below the edge of said blade.

3. A machine as described in claim 1, wherein said gripper device is downwardly shiftable after said stock is gripped between said gripper bars.

4. A machine as described in claim 2, wherein said stock supporting device is provided with a longitudinal cooling water pipe in heat transfer contact along its jaw adjacent portion.

5. A machine as described in claim 1, wherein said jaw means are longitudinally bored and provided with resistance heating rods in said bores, and at least one of said jaw means is provided with shiftable heat resistant plastic sheet means extending over its clamping faces to provide ready separation of the stock from said jaw means when heated for seam welding.

6. A machine as described in claim 5, wherein both said jaw means are provided with said plastic sheet means, and wherein said upper bar is spring biased downwardly relative to said upper jaw and support.

7. A machine as described in claim 1, wherein said blade has a saw-toothed working edge.

References Cited

UNITED STATES PATENTS 3,257,256   6/1966   Lehmacher et al. ____ 156—515

DOUGLAS J. DRUMMOND, *Primary Examiner.*

UNITED STATES PATENT OFFICE
CERTIFICATE OF CORRECTION

Patent No. 3,384,528

May 21, 1968

Michael Lehmacher et al.

It is certified that error appears in the above identified patent and that said Letters Patent are hereby corrected as shown below:

Column 5, line 1, "faces 15a and 15b on the jaw 12, so that it clamps the film" should read -- faces 15b there is no part of the film-tube present which --.

Signed and sealed this 14th day of October 1969

(SEAL)
Attest:

Edward M. Fletcher, Jr.
Attesting Officer

WILLIAM E. SCHUYLER, JR.
Commissioner of Patents